(12) United States Patent
Priore et al.

(10) Patent No.: US 11,997,526 B2
(45) Date of Patent: *May 28, 2024

(54) SYSTEMS AND METHODS FOR NETWORK DEVICE MANAGEMENT

(71) Applicant: COMCAST CABLE COMMUNICATIONS, LLC, Philadelphia, PA (US)

(72) Inventors: Thomas Priore, Philadelphia, PA (US); Kevin Colflesh, Philadelphia, PA (US); Jason Warren, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/727,290

(22) Filed: Apr. 22, 2022

(65) Prior Publication Data

US 2022/0303818 A1 Sep. 22, 2022

Related U.S. Application Data

(63) Continuation of application No. 15/981,727, filed on May 16, 2018, now Pat. No. 11,343,697.

(51) Int. Cl.
*H04W 28/02* (2009.01)
*H04W 24/02* (2009.01)
*H04W 76/18* (2018.01)
*H04W 84/12* (2009.01)

(52) U.S. Cl.
CPC ....... *H04W 28/0215* (2013.01); *H04W 24/02* (2013.01); *H04W 28/0226* (2013.01); *H04W 28/0236* (2013.01); *H04W 76/18* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 7,536,595 B1 * | 5/2009 | Hiltunen | G06F 11/0793 714/26 |
| 7,599,686 B2 | 10/2009 | Quinn et al. | |
| 8,380,126 B1 | 2/2013 | Ma | |
| 8,798,548 B1 | 8/2014 | Carbajal | |
| 8,977,212 B2 | 3/2015 | Carbajal | |
| 9,258,174 B1 | 2/2016 | Gerstel | |
| 10,491,459 B1 | 11/2019 | Andreas | |
| 11,343,697 B2 * | 5/2022 | Priore | H04W 76/18 |
| 2009/0274104 A1 | 11/2009 | Addy | |
| 2015/0003232 A1 | 1/2015 | Friskney | |

(Continued)

OTHER PUBLICATIONS

U.S. Appl. No. 15/981,727 (2019/0357074), filed May 16, 2018 (Nov. 21, 2019), Thomas Priore.

*Primary Examiner* — Phirin Sam
(74) *Attorney, Agent, or Firm* — Ballard Spahr LLP

(57) ABSTRACT

Systems and methods for network device management are described. An indication of a failed network connection between a first user device and a second network device can be received. Using data from the first network device, the first user device, at least one second network device, and/or at least one second user device, one or more characteristics of the first network device and/or the at least one second network device can be determined. Modification of the determined one or more characteristics can be caused.

30 Claims, 6 Drawing Sheets

(56) References Cited

U.S. PATENT DOCUMENTS

| | | |
|---|---|---|
| 2016/0234727 A1 | 8/2016 | Sridhar |
| 2017/0272960 A1 | 9/2017 | Li |
| 2018/0139086 A1 | 5/2018 | Chakraborty |
| 2018/0213041 A1 | 7/2018 | Biswas |
| 2018/0279128 A1 | 9/2018 | Zaifuddin |
| 2018/0338342 A1 | 11/2018 | Ferro |
| 2019/0180770 A1 | 6/2019 | Kothari |
| 2020/0178340 A1 | 6/2020 | Zhang |

\* cited by examiner

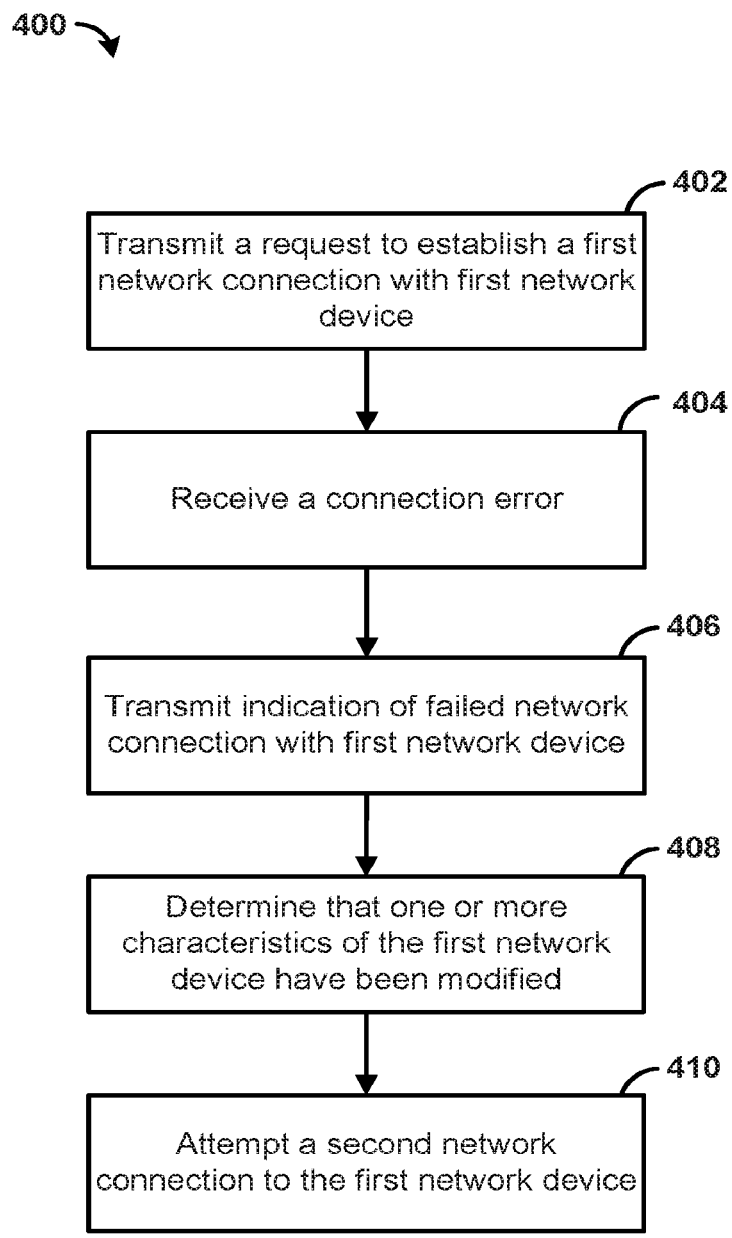

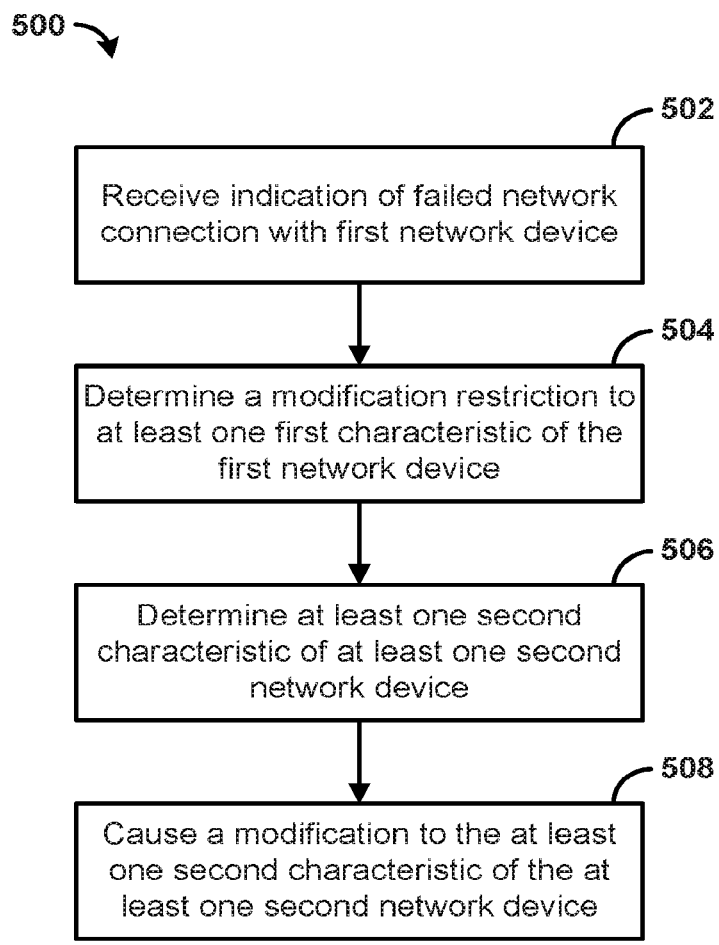

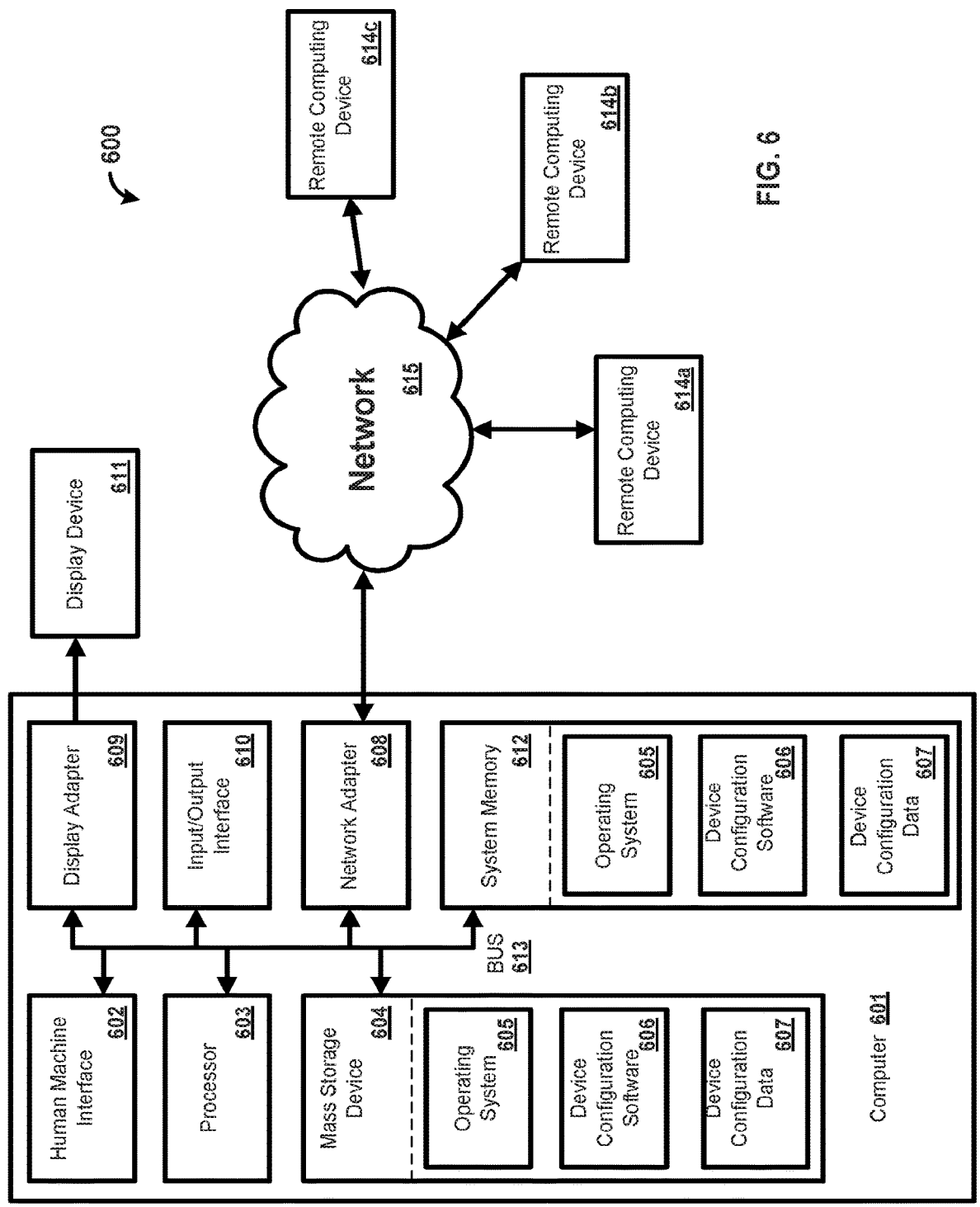

SYSTEMS AND METHODS FOR NETWORK DEVICE MANAGEMENT

CROSS REFERENCE TO RELATED PATENT APPLICATIONS

This application claims priority under 35 U.S.C. § 120 to, and is a continuation of, U.S. patent application Ser. No. 15/981,727, filed on May 16, 2018, the entire contents of which are hereby incorporated herein by reference for all purposes.

BACKGROUND

Network devices such as wireless Access Points (APs) may scan a wireless channel spectrum to select a channel for a wireless network made available by the AP. The channel may be selected by identifying the channels with the least amount of interference or contention, or any other metric. However, this scan is performed at the APs and only reflects the congestion and interference at that specific point in space where the AP is located. The AP has clients that may be physically located some distance away. The congestion and interference at the endpoint may be significantly different then that measured by the AP. These and other shortcomings are overcome by the methods and systems set forth herein.

SUMMARY

It is to be understood that both the following general description and the following detailed description are exemplary and explanatory only and are not restrictive. Provided are methods and systems for network device management. A computing device may receive (e.g., from a user device) an indication of a failed network connection with the network device (e.g., WiFi). The failed network connection may include a failed attempt by the user device to connect with the network or a disconnection of the user device from the network. The indication of the failed network connection may be transmitted to the computing device by another network connection available to the user device other than the failed network connection (e.g., cellular). One or more characteristics of the network device may be modified to facilitate the user device connecting with the network. Additionally, one or more characteristics of another network device may be modified to facilitate the user device connecting with the network to which the user device initially failed to connect. The one or more characteristics that are modified, as well as the network device whose characteristics are modified, may be determined based on access or modification restrictions and/or data received from the user device, other user devices, the network device, and/or one or more other network devices.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show embodiments and together with the description, serve to explain the principles of the methods and systems:

FIG. 4 is a flowchart of an example method;
FIG. 5 is a flowchart of an example method;
and
FIG. 6 is a flowchart of an example method.

DETAILED DESCRIPTION

Figure 1:
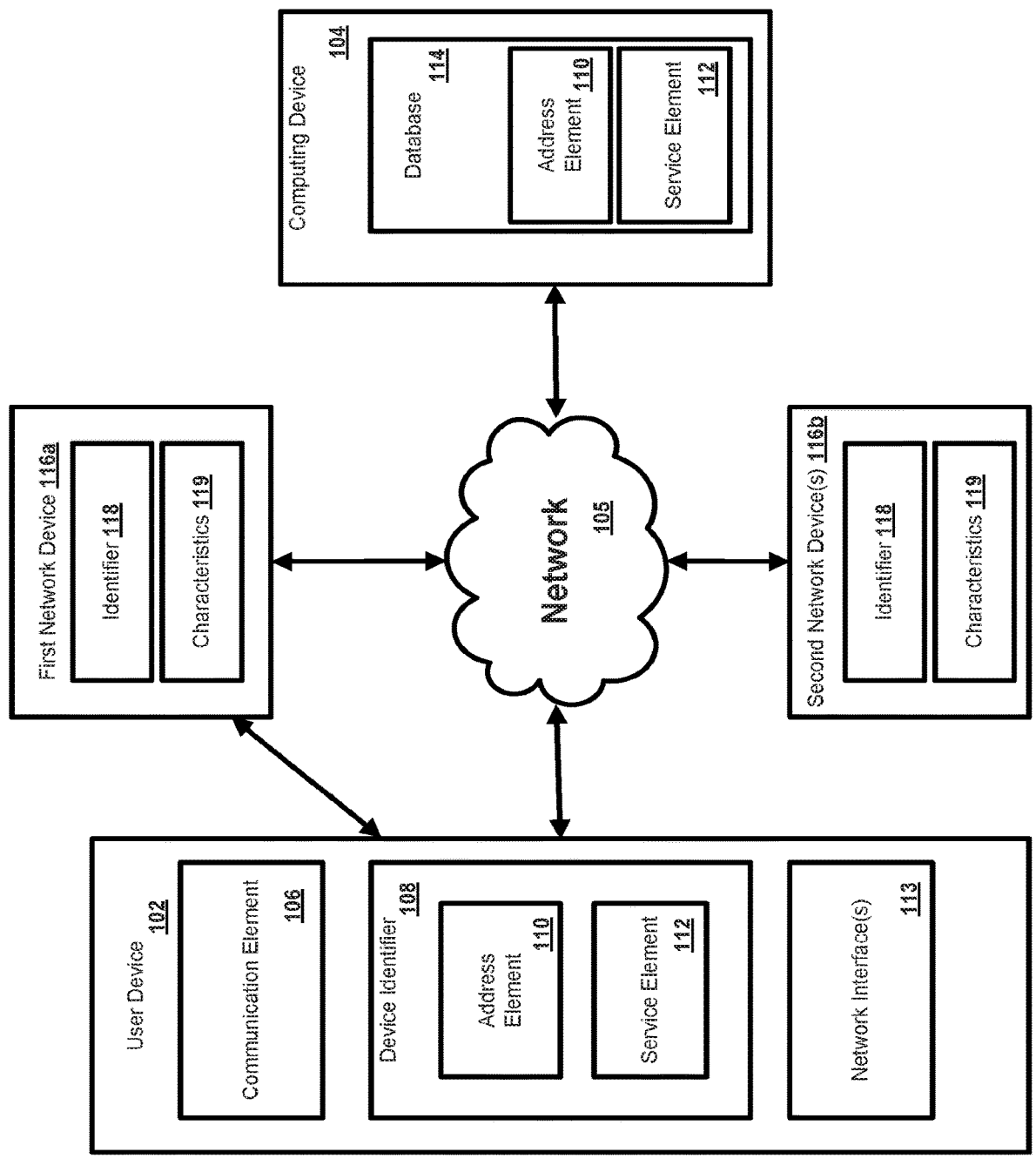
FIG. 1 is a diagram of an example network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Described herein are components that can be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all aspects of this application including, but not limited to, steps in described methods. Thus, if there are a variety of additional steps that can be performed it is understood that each of these additional steps can be performed with any specific embodiment or combination of embodiments of the described methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

Described herein are systems and methods for network device configuration. Network devices such as wireless Access Points (APs) may scan a wireless channel spectrum to select a channel for a wireless network made available by the network device. The channel may be selected by identifying the channels with the least amount of interference or contention, or any another metric. However, this scan is performed by the network device and only reflects the congestion and interference at that specific point in space where the network device is located. The congestion and interference at user devices connected to or attempting to connect to the network device may be significantly different then that measured by the network device. For example, a user device may be within a signal range of a first network device and a second network device. However, the first network device and the second network device may not be within signal range of each other. When either the first network device or the second network device attempts to scan the wireless spectrum to determine a channel to operate on, neither network device takes the operating channel of the other network device into consideration. Thus, the first network device and/or the second network device may operate using channels that result in interference experienced by the user device. The first network device and the second network device may be configured to broadcast the same Service Set Identifier (SSID), resulting in SSID collision. As neither network device may detect a beacon of the other network device, the first and second network device would not automatically implement measures to avoid the SSID collision.

A computing device or server may be in communication with one or more network devices, as well as one or more user devices. For example, an entity may manage the network devices and/or the user devices. The one or more user devices may be configured to communicate via more than one communication protocol and/or network. For example, a user device may be configured to communicate via both WiFi and cellular. When a user device experiences a failed network connection with a network device, the user device may transmit an indication of the failed network connection to the computing device via an alternate communications network. For example, a user device experiencing a failed wireless local area network (WLAN) connection may transmit the indication of the failed network connection to the computing device using a cellular connection.

As the computing device is in communication with network devices and user devices alike, the computing device may receive data indicating wireless activity detected by the respective network devices and/or user devices. Such data may include, for example, SSIDs, wireless channels, modulation schemes, power levels, implemented wireless standards, network device identifiers, or other data of networks detected by the respective network devices and/or user devices. Such data may be detected by receiving, from a network device, a beacon comprising the data. The computing device may determine one or more characteristics of one or more network devices to modify in order to facilitate a wireless connection by the user device to the network device associated with the failed connection. The computing device may determine the characteristics of the one or more network devices to modify after receiving the indication of the failed network connection, using the received data. Such characteristics may include an SSID, a wireless channel, an implemented wireless standard, a transmission power level, or other characteristics. The one or more network devices may include the network device associated with the failed connection. The one or more network devices may also be distinct from the network device associated with the failed connection. The computing device may then cause modification of the determined one or more characteristics. Additionally, the computing device may transmit a notification to the user device through the alternate communications network through which the indication of the failed network connection was received. The notification may indicate, to the user device, to attempt another network connection to the user device.

A system configured to provide services such as network-related services to a user device is described herein. FIG. 1 shows an environment in which the present methods and systems may operate. Described herein are systems and methods for providing services to a device, for example, a user device such as a computer, tablet, mobile device, communications terminal, or the like. One or more network devices can be configured to provide various services to one or more devices, such as devices located at or near a premises. The network devices can be configured to recognize an authoritative device for the premises and/or a particular service or services available at the premises. An authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system may comprise a user device 102 in communication with a computing device 104 such as a server. The computing device 104 may be disposed locally or remotely relative to the user device 102. The user device 102 and the computing device 104 can be in communication via a private and/or public network 105 such as the Internet or a local area network. Other forms of communications can be used such as wired and wireless telecommunication channels.

The user device 102 may be an electronic device such as a computer, a smartphone, a laptop, a tablet, a set top box, a display device, or other device capable of communicating with the computing device 104. The user device 102 can comprise a communication element 106 for providing an interface to a user to interact with the user device 102 and/or the computing device 104. The communication element 106 may be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the computing device 104. The communication element 106 may request or query various files from a local source and/or a remote source. The communication element 106 can transmit data to a local or remote device such as the computing device 104.

The user device 102 may be associated with a user identifier or device identifier 108. The device identifier 108 can be any identifier, token, character, string, or the like, for differentiating one user or user device (e.g., user device 102) from another user or user device. The device identifier 108 may identify a user or user device as belonging to a particular class of users or user devices. The device identifier 108 can comprise information relating to the user device such as a manufacturer, a model or type of device, a service provider associated with the user device 102, a state of the user device 102, a locator, and/or a label or classifier. Other information may be represented by the device identifier 108.

The device identifier 108 may comprise an address element 110 and a service element 112. The address element 110 may comprise or provide an internet protocol address, a network address, a media access control (MAC) address, an Internet address, or the like. The address element 110 can be relied upon to establish a communication session between the user device 102 and the computing device 104 or other devices and/or networks. The address element 110 may be used as an identifier or locator of the user device 102. The address element 110 can be persistent for a particular network.

The service element 112 may comprise an identification of a service provider associated with the user device 102 and/or with the class of user device 102. The class of the user device 102 may be related to a type of device, capability of device, type of service being provided, and/or a level of service (e.g., business class, service tier, service package, etc.). The service element 112 can comprise information relating to or provided by a communication service provider (e.g., Internet service provider) that may be providing or enabling data flow such as communication services to the user device 102. The service element 112 can comprise information relating to a preferred service provider for one or more particular services relating to the user device 102. The address element 110 may be used to identify or retrieve data from the service element 112, or vice versa. One or more of the address element 110 and the service element 112 can be stored remotely from the user device 102 and retrieved by one or more devices such as the user device 102 and the computing device 104. Other information may be represented by the service element 112.

The user device 102 may include one or more network interfaces 113. The network interfaces 113 comprise transceiver facilitating the connection of the user device to the network 105. The network interfaces 113 can include a cellular transceiver facilitating a cellular connection to the network 105. The network interfaces 113 may also include wireless radios facilitating a wireless connection to the network 105. Such wireless radios may include Wi-Fi transceivers, Bluetooth transceivers, infrared transceivers, or other transceivers as can be appreciated. The network interfaces 113 may also include wired network interfaces 113, such as Ethernet interfaces, cable interfaces, or other wired network interfaces 113. The user device 102 can comprise multiple network interfaces 113 allowing for the transmission and reception of data across multiple communications channels. The user device 102 may transmit data to or receive data from the computing device 104 using any of the multiple network connections available through the network interfaces 113.

The computing device 104 may be a server for communicating with the user device 102, the first network device 116a, and/or the at least one second network device 116b. The computing device 104 may communicate with the user device 102 for providing data and/or services. The computing device 104 can provide services such as network (e.g., Internet) connectivity, network printing, media management (e.g., media server), content services, streaming services, broadband services, or other network-related services. The computing device 104 can allow the user device 102 to interact with remote resources such as data, devices, and files. The computing device may be configured as (or disposed at) a central location (e.g., a headend, or processing facility), which can receive content (e.g., data, input programming) from multiple sources. The computing device 104 may combine the content from the multiple sources and can distribute the content to user (e.g., subscriber) locations via a distribution system.

The computing device 104 may manage the communication between the user device 102 and a database 114 for sending and receiving data therebetween. The database 114 may store a plurality of files (e.g., web pages), user identifiers or records, or other information. The user device 102 can request and/or retrieve a file from the database 114. The database 114 can store information relating to the user device 102 such as the address element 110 and/or the service element 112. The computing device 104 may obtain the device identifier 108 from the user device 102 and retrieve information from the database 114 such as the address element 110 and/or the service elements 112. The computing device 104 may obtain the address element 110 from the user device 102 and may retrieve the service element 112 from the database 114, or vice versa. Any information can be stored in and retrieved from the database 114. The database 114 may be disposed remotely from the computing device 104 and accessed via direct or indirect connection. The database 114 can be integrated with the computing system 104 or some other device or system.

One or more first network devices 116a and/or second network devices 116b may be in communication with a network such as the network 105. One or more of the first network devices 116a and/or the second network devices 116b may facilitate the connection of a device, such as user device 102, to the network 105. One or more of the network devices 116 can be configured as a wireless access point (WAP). One or more of the first network devices 116a and/or the second network devices 116b can be configured to allow one or more wireless devices to connect to a wired and/or wireless network using Wi-Fi, Bluetooth or any desired method or standard.

One or more of the first network devices 116a and/or the second network devices 116b can be configured as a local area network (LAN). One or more of the first network devices 116a and/or the second network devices 116b can comprise a dual band wireless access point. One or more of the first network devices 116a and/or the second network devices 116b can be configured with a first service set identifier (SSID) (e.g., associated with a user network or private network) to function as a local network for a particular user or users. One or more of the first network devices 116a and/or the second network devices 116b can be configured with a second service set identifier (SSID) (e.g., associated with a public/community network or a hidden network) to function as a secondary network or redundant network for connected communication devices.

One or more of the first network devices 116a and/or the second network devices 116b may comprise an identifier 118. One or more identifiers may be or relate to an Internet Protocol (IP) Address IPV4/IPV6 or a media access control address (MAC address) or the like. One or more identifiers 118 may be a unique identifier for facilitating communications on the physical network segment. Each of the first network devices 116a and/or the second network devices 116b can comprise a distinct identifier 118. The identifiers 118 may be associated with a physical location of the first network devices 116a and/or the second network devices 116b.

One or more of the first network devices 116a and/or the second network devices 116b may comprise one or more characteristics 119 corresponding to attributes of a wireless network implemented by the first network devices 116a and/or the second network devices 116b. The one or more characteristics 119 may include an SSID, transmission power, wireless channel, wireless networking standard, modulation scheme, or other attributes of the wireless network implemented by the first network devices 116a and/or the second network devices 116b. The one or more characteristics 119 may include one or more antennas (unidirectional or multidirectional) facilitating transmission or reception of signals from the network device 116.

Although the following discussion relates to the computing device 104 causing modification to one or more characteristics 119 of a network device after a failed network connection by the user device 102, it is understood that the computing device 104 may cause modification to one or more characteristics 119 of a network device after other events. The computing device 104 may cause modification to one or more characteristics 119 of a network device after an interference level satisfying a threshold. The computing device 104 may cause modification to one or more characteristics 119 of a network device in after a detected SSID collision. Further, as will be appreciated by one skilled in the art, causing modification to the one or more characteristics 119 does not need to follow after an event.

The computing device 104 may receive, from a first user device 102, an indication of a failed network connection with a first network device 116a. A mobile device (user device 102) may attempt to connect to a WiFi access point (first network device 116a), and the connection attempt may fail. The indication of the failed network connection may include an identifier 118 of the first network device 116a or one or more characteristics 119 of the first network device 116a. The user device 102 may detect the identifier 118 or one or more characteristics 119 of the first network device 116a from a beacon transmitted by the first network device. The identifier 118 or one or more characteristics 119 from the beacon may then be included in the indication of the failed network connection.

The indication of the failed network connection with the first network device 116a may correspond to a disconnection from the first network device 116a. A mobile device may have an established connection with a WiFi access point which drops or otherwise becomes disconnected. The indication of the failed network connection with the first network device 116a may correspond to a failure to receive, by the first user device 102, a response to a request transmitted to the first network device 116a within a predefined time. The user device 102 may experience a connection error, such as a Hyper Text Transfer Protocol (HTTP) 408 error (client request timeout) or an HTTP 504 error (gateway timeout). The connection error may occur after transmitting a request to the network device 116a. The failed network connection may correspond to a first network connection type and the indication of the failed network connection may be transmitted by the first user device 102 to the computing device 104 through another network connection of a second network connection type. The failed network connection may correspond to a failed wireless local area network (WLAN) connection, while the indication of the failed network connection may be transmitted by the first user device 102 to the computing device 104 using a cellular network connection available to the first user device 102.

The computing device 104 may determine at least one characteristic 119 of a network device for modification. The computing device 104 may determine the at least one characteristic 119 of the network device for modification after receiving the indication of the failed network connection. As will be described in further detail below, the network device whose at least one characteristic 119 will be modified may include the first network device 116a, or at least one second network device 116b. Accordingly, determining the at least one characteristic 119 of the network device for modification may include determining one or more of the first network device 116a or the at least one second network device 116b. The first network device 116a or the at least one second network device 116b may be determined as the network device whose characteristics 119 are modified based on a priority tier or other ordering. The first network device 116a (to which the first user device 102 attempted to connect) may be preferably determined over the at least one second network device 116b. Determining one or more of the first network device 116a or the at least one second network device 116b may include excluding those of the first network device 116a or the at least one second network device 116b that are restricted from access or modification caused by the computing device 104. An entity associated with the computing device 104 may manage a subset of network devices including the first network device 116a or the at least one second network device 116b. Thus, the computing device 104 may only have access, permissions, or ability to modify characteristics 119 of the subset of network devices.

The at least one characteristic 119 of the network device (first network device 116a or at least one second network device 116)b may be determined based on one or more characteristics 119 of the first network device 116a corresponding to a wireless network implemented by the first network device 116a. The first network device 116a may transmit the one or more characteristics 119 to the computing device 104. Such characteristics 119 may include an SSID, wireless channel, modulation type, wireless network standard, power level, identifiers 118 (e.g., Media Access Control (MAC) addresses), network addresses (e.g., Internet Protocol (IP) addresses), or attribute of the wireless network implemented by the first network device 116.

The at least one characteristic 119 of the network device (first network device 116a or at least one second network device 116b) may be determined based on data received from the first network device 116a indicating wireless network activity detected by the first network device 116a. The data indicating wireless activity detected by the first network device 116a may also include characteristics 119 of the at least one second network device 116b detected by the first network device 116a. The first network device 116a may receive beacons or other signals transmitted by the at least one second network device 116b indicating the characteristics 119 of the at least one second network device 116b. The characteristics 119 of the at least one second network device 116b may then be transmitted by the first network device 116a to the computing device 104. The data indicating wireless activity detected by the first network device 116a may also include detected interference levels or signal strengths (e.g., a received signal strength indicator (RSSI)).

The at least one characteristic 119 of the network device (first network device 116a or at least one second network device 116b) may be determined based on one or more characteristics 119 of the at least one second network device 116b corresponding to a wireless network implemented by the at least one second network device 116b. The at least one second network device 116b may transmit the one or more characteristics 119 to the computing device 104. The at least one characteristic 119 of the network device (first network device 116a or at least one second network device 116b) may be determined based on data received by the computing device 104 from the at least one second network device 116b indicating wireless network activity detected by the at least one second network device 116b.

The at least one characteristic 119 of the network device (first network device 116a or at least one second network device 116b) may also be determined based on data received by the computing device 104 from the first user device 102 indicating wireless network activity detected by the first user device 102. The data indicating wireless network activity detected by the first user device 102 may be associated with the first network device 116a or the at least one second network device 116b. The first network device 116a and at least one second network device 116b may or may not detect each other, but are detectable by the first user device 102. The at least one characteristic 119 of the network device (first network device 116a or at least one second network device 116b) may also be determined based on data received by the computing device 104 from the at least one second user device 102 indicating wireless network activity detected by the at least one second user device 102. The at least one second user device 102 may be associated with the first network device 116a or the at least one second network device 116b. The at least one second user device 102 may have an established network connection (e.g., WLAN connection) with the first network device 116a or the at least one second network device 116b. The at least one second user device 102 may be independent of the first network device 116a and the at least one second network device 116b. The at least one second user device 102 may receive beacons or other signals from the first network device 116a or the at least one second network device 116b, but not maintain a network connection to the first network device 116a or the at least one second network device 116b. The at least one second user device 102 may then transmit, to the computing device 104, data based on the beacons indicating wireless network activity detected by the at least one second user device 102.

The data described above received by the computing device 104 may be transmitted by the first network device 116a, the at least one second network device 116b, the first user device 102, and/or the second user device 102 at a predefined interval. The data described above received by the computing device 104 may be transmitted by the first network device 116a, the at least one second network device 116b, the first user device 102, and/or the second user device 102. The data described above received by the computing device 104 may be transmitted after a request from the computing device 104. The data described above received by the computing device 104 may be transmitted by the first network device 116a, the at least one second network device 116b, the first user device 102, and/or the second user device 102 after receiving a user input. The data described above received by the computing device 104 may be transmitted by the first user device 102 through a cellular connection or other connection different from the failed network connection to the first network device 116a. If the first user device 102 attempted a failed WiFi connection to the first network device 116a, the first user device 102 may transmit the data to the computing device 104 using a cellular connection.

The at least one characteristic 119 of the network device (first network device 116a or at least one second network device 116b) may be determined based on location data associated with the first network device 116a, the at least one second network device 116b, the first user device 102, and/or the second user device 102. The first network device 116a, the at least one second network device 116b, the first user device 102 and/or the second user device 102 may each have a Global Positioning System (GPS) radio. The location data may then be transmitted to the computing device 104 by the first network device 116a, the at least one second network device 116b, the first user device 102, and/or the second user device 102. The location data may also correspond wireless network triangulation data, or cellular network triangulation data determined by the first network device 116a, the at least one second network device 116b, the first user device 102 and/or the second user device 102 and transmitted to the computing device. The location data may be determined by determining a user account associated with the first network device 116a, the at least one second network device 116b, the first user device 102, and/or the second user device 102. The location data may then be determined as an address or other location identifier associated with the account. The location data may be stored in a database or lookup table, e.g., when the first network device 116a and/or at least one second network device 116b is installed.

Using the location data, determining the at least one first characteristic 119 of the network device (first network device 116a or at least one second network device 116b) may include correlating the location data with the data described above received from the first network device 116a, the at least one second network device 116b, the first user device 102, and/or the second user device 102 (e.g., data indicating detected wireless activity or data associated with implemented wireless networks).

Determining the at least one characteristic 119 of the network device (first network device 116a or at least one second network device 116b) may include applying a machine learning model (e.g., a Bayesian model or a neural network) to the location data and/or the data received from the first network device 116a, the at least one second network device 116b, the first user device 102, and/or the second user device 102. A machine learning model may be trained based on training data indicating which characteristics 119 of which network devices 119 were modified, and an indication as to a result of the modification. The result may indicate a successful or failed network connection by a user device 102 to the first network device 116a. The result may indicate a successful or failed network connection by the user device 102 to the first network device 116a after the modification, an increase or reduction in interference or signal strength detected by user devices 102 and/or network devices, after the modification, an increase or decrease in bandwidth or throughput after the modification, or other results. The output of the machine learning model may then be used to determine which network device to modify (the first network device 116a or the at least one second network device 116b) and/or to determine which one or more characteristics 119 of the determined network device to modify.

A rule-based model (e.g., a decision tree) may be applied to the location data and/or the data received from the first network device 116a, the at least one second network device 116b, the first user device 102, or the second user device 102 to determine which network device (the first network device 116a or the at least one second network device 116b) and/or to determine which one or more characteristics 119 of the determined network device to modify. A combination of machine learning models and rule-based models may be applied to the location data and/or the data received from the first network device 116a, the at least one second network device 116b, the first user device 102, and/or the second user device 102 to determine which network device (the first network device 116a or the at least one second network device 116b) and/or to determine which one or more characteristics 119 of the determined network device to modify.

The computing device 104 then causes modification to the determined one or more characteristics 119 of the determined network device. Causing modification to the determined one or more characteristics 119 of the determined network device may include transmitting instructions to the determined network device. The computing device 104 may transmit instructions to the determined network device via an application programming interface (API) exposed by the determined network device 116. The computing device 104 may transmit instructions to the determined network device to modify an SSID, transmission power, wireless channel, wireless networking standard, modulation scheme, or other attributes of the wireless network implemented by determined network device. The computing device 104 may transmit instructions to the determined network device to enable or disable one or more directional antennas based on the location of the determined network device and/or other network devices. The computing device 104 may also transmit a notification or message to the first and/or second user device 102. The notification may include user-performable steps to improve network performance, such as moving closer to a network device or away from a source of interference.

Figure 2:
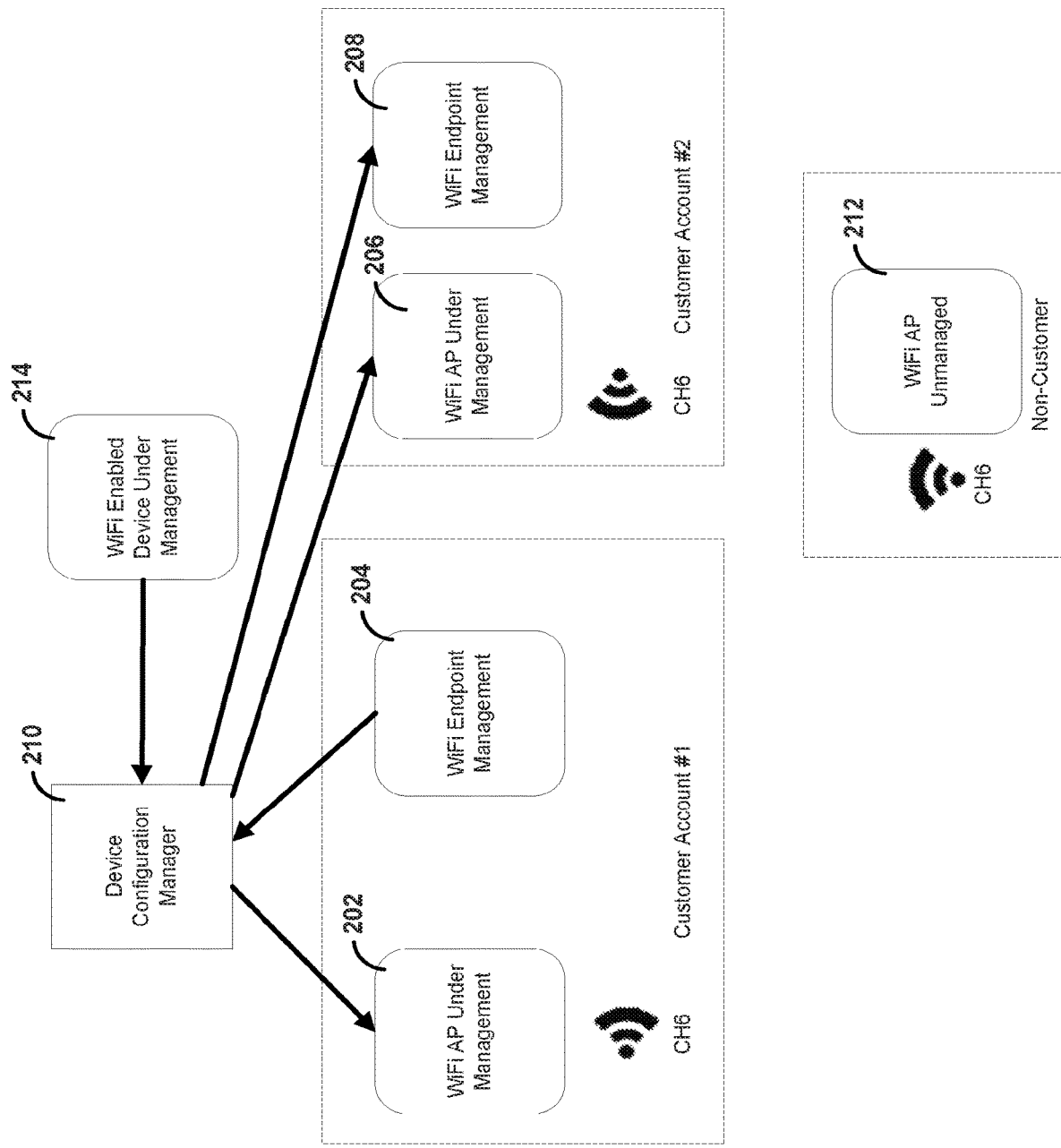
FIG. 2 is an example scenario for network device management.

FIG. 2 depicts a scenario 200 for network device management. As shown, a first customer account may be associated with a WiFi AP 202 (e.g., a first network device 116a), and a WiFi Endpoint 204 (e.g., a first user device 102). A second customer account may be associated with Wi-Fi AP 206 (e.g., a second network device 116b), and WiFi Endpoint 208 (e.g., a second user device 102). The first and second customer accounts are customers with respect to an entity associated with a device configuration manager 210. A Wi-Fi endpoint 212 may be associated with a non-customer. Here, WiFi AP 202, WiFi Endpoint 204, WiFi AP 206, and WiFi Endpoint 208 are "under management" by the device configuration manager 210. Also "under management" by the device configuration manager 210 may be a Wi-Fi Enabled Device 214. In this scenario 200, the device configuration manager 210 may modify one or more characteristics 119 of a respective WiFi AP (WiFi AP 202 and WiFi AP 206) "under management." The device configuration manager 210 may also receive, from a WiFi AP, WiFi Endpoint, or WiFi Enabled device "under management," data indicating wireless activity detected by the respective device, and/or characteristics 119 of an implemented wireless network in the case of WiFi APs.

In this scenario, WiFi AP 202, WiFi AP 206, and WiFi AP 212 are each operating using WiFi channel 6. The device configuration manager 210 may modify one or more characteristics of the Wi-Fi AP 202 or Wi-Fi AP 206 based on data received from each respective device in the scenario 200. The device configuration manager 210 may modify one or more characteristics of the Wi-Fi AP 202 or Wi-Fi AP 206 based on data received from each respective device in the scenario 200 after a network connection by the WiFi Endpoint 204, WiFi Endpoint 208, or WiFi Enabled Device 214 (should the WiFi Enabled Device be in signal range of WiFi AP 202, WiFi AP 206, and/or Wi-Fi AP 212) fails. Thus, characteristics 119 of the WiFi AP 202 and WiFi AP 206 may be modified using a broader set of data taken from the perspective of multiple devices. This provides advantages over spectrum hopping solutions implementing decisions based on observations limited to the perspective of a given network device.

Figure 3:
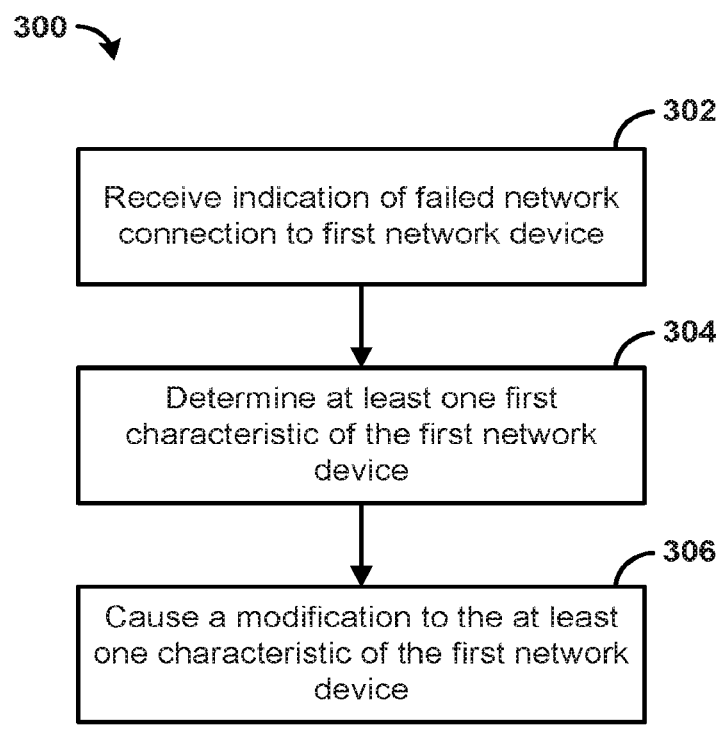
FIG. 3 is a flowchart of an example method.

FIG. 3 is a flowchart 300 of an example method. In step 302, an indication of a failed network connection of a first user device 102 with a first network device 116a may be received (e.g., by a computing device 104). For example, the indication of a failed network connection with the first network device 116a may correspond to a failed attempt by the first user device 102 to establish a network connection (e.g., a cellular connection, a WiFi connection) with the first network device 116a. The indication of the failed network connection with the first network device 116a may correspond to a disconnection by the first user device 102 from the first network device 116a. The indication of the failed network connection with the first network device 116a may correspond to a failure to receive, by the first user device 102, a response to a request transmitted to the first network device 116a within a predefined time. The failed network connection may correspond to a first network connection type and the indication of the failed network connection may be transmitted by the first user device 102 through another network connection of a second network connection type. The failed network connection may correspond to a failed wireless local area network (WLAN) connection, while the indication of the failed network connection may be transmitted by the first user device 102 using a cellular network connection available to the first user device 102.

At step 304, at least one first characteristic 119 of the first network device 116a may be determined (e.g., by the computing device 104). The at least one first characteristic 119 of the first network device 116a may be determined after receiving the indication of the failed network connection. The one or more first characteristics 119 may include an SSID, a transmission power, a wireless channel, a wireless networking standard, a modulation scheme, or other attributes of the wireless network implemented by the first network device 116a. The one or more first characteristics 119 may include one or more antennas (unidirectional or multidirectional) facilitating transmission or reception of signals to or from the first network device 116a.

The at least one first characteristic 119 of the first network device 116a may be determined based on one or more characteristics 119 of the first network device 116a corresponding to a wireless network implemented by the first network device 116a. The one or more characteristics 119 corresponding to the wireless network implemented by the first network device 116a may be received from the first network device 116a. Such characteristics 119 may include an SSID, a wireless channel, a modulation type, a wireless network standard, a power level, identifiers 118 (e.g., Media Access Control (MAC) addresses), network addresses (e.g., Internet Protocol (IP) addresses), or other attribute of the wireless network implemented by the first network device 116a.

The at least first one characteristic 119 of the first network device 116a may be determined based on data received from the first network device 116a indicating wireless network activity detected by the first network device 116a. The data indicating wireless activity detected by the first network device 116a may also indicate at least one second characteristic 119 from at least one second network device 116b detected by the first network device 116a. The first network device 116a may receive beacons or other signals transmitted by the at least one second network device 116b indicating the at least one second characteristic 119 of the at least one second network device 116b. The at least one second characteristic 119 of the at least one second network device 116b may then be transmitted by the first network device 116a to the computing device 104. The data indicating wireless activity detected by the first network device 116a may also include detected interference levels or signal strengths (e.g., a received signal strength indicator (RSSI)).

The at least one first characteristic 119 of the first network device 116a may be determined based on one or more second characteristics 119 of the at least one second network device 116b corresponding to a wireless network implemented by the at least one second network device 116b. The at least one second network device 116b may transmit the one or more characteristics 119 for reception (e.g., by the computing device 104). The at least one first characteristic 119 of the first network device 116a may be determined based on data received from the at least one second network device 116a indicating wireless network activity detected by the at least one second network device 116b.

The at least one first characteristic 119 of the first network device 116a may also be determined based on data received (e.g., by the computing device 104) from the first user device 102 indicating wireless network activity detected by the first user device 102. The data indicating wireless network activity detected by the first user device 102 may be associated with the first network device 116a or the at least one second network device 116b. The first network device 116a and at least one second network device 116b may or may not detect each other, but are detectable by the first user device 102. The at least one first characteristic 119 of the first network device 116a may also be determined based on data received (e.g., by the computing device 104) from at least one second user device 102 indicating wireless network activity detected by the at least one second user device 102. The at least one second user device 102 may be associated with the first network device 116a or the at least one second network device 116b. The at least one second user device 102 may have an established network connection (e.g., WLAN connection) with the first network device 116a or the at least one second network device 116b. The at least one second user device 102 may be independent of the first network device 116a and the at least one second network device 116b. The at least one second user device 102 may receive beacons or other signals from the first network device 116a or the at least one second network device, but not maintain a network connection with the first network device 116a or at least one second network device 116b. The at least one second user device 102 may then transmit (e.g., to the computing device 104) data based on the beacons indicating wireless network activity detected by the at least one second user device 102.

The at least one first characteristic 119 of the first network device 116a may be determined based on location data associated with the first network device 116a, the at least one second network device 116b, the first user device 102, and/or the second user device 102. The location data may correspond to global positioning system (GPS) data, wireless network triangulation data, or cellular network triangulation data. The location data may be determined by the computing device 104. Determining the location data may include determining a user account associated with the first network device 116a, the at least one second network device 116b, the first user device 102, and/or the second user device 102. The location data may then be determined as an address or other location identifier associated with the account.

Using the location data, determining the at least one first characteristic 119 of the first network device 116a may include correlating the location data with the data described above received from the first network device 116a, the at least one second network device 116b, the first user device 102, and/or the second user device 102 (e.g., data indicating detected wireless activity or data associated with implemented wireless networks).

Determining the at least one first characteristic 119 of the first network device 116a may include applying a machine learning model and/or a rule-based model to the location data and/or the data received from the first network device 116a, the at least one second network device 116b, the first user device 102, and/or the second user device 102.

At step 306, modification to the at least one first characteristic 119 of the first network device 116a may be caused (e.g., by the computing device 104). The modification to the at least one first characteristic 119 of the first network device 116a may be caused after determining the at least one first characteristic 119 of the first network device 116a. Causing modification to the at least one first characteristic 119 may include transmitting instructions to the first network device 116a. Instructions may be transmitted to the first network device 116a via an application programming interface (API) exposed by the first network device 116a. The instructions may be transmitted to the first network device 116a to modify an SSID, transmission power, wireless channel, wireless networking standard, modulation scheme, or other attributes of the wireless network implemented by first network device 116a. Instructions may be transmitted to the first network device 116a to enable or disable one or more directional antennae of the first network device 116a based on the location of the first network device 116a and/or the at least one second network device 116b.

A mobile device fails an attempt to connect to a first WiFi access point. The mobile device transmits an indication of the failed network connection to a server using a cellular connection. The server receives, from the first WiFi access point, data indicating that the first Wi-Fi access point may be operating on Wi-Fi channel 6. The server also receives, from a second WiFi access point, data indicating that the second Wi-Fi access point may be operating on Wi-Fi channel 6. The server may access location data for the first and second WiFi access points from a database. The location data indicates that both the first and second WiFi access points are within a distance threshold relative to the mobile device. As two WiFi access points near the mobile device are operating on the same WiFi channel, this may affect the ability for the mobile device to connect to the first WiFi access point. The server then transmits instructions to the first WiFi access point to change its WiFi channel.

FIG. 4 is a flowchart 400 of a method. In step 402, a request to establish a first network connection with a first network device 116a may be transmitted (e.g., by a user device 102 to the first network device 116a). The first network device 116a may comprise a wireless access point, and the request may comprise a request to establish a wireless network connection. The request may include a Service Set Identifier (SSID) corresponding to a wireless network implemented by the first network device 116a. The request may also include usernames, passwords, or other authentication credentials facilitating the first network connection to the first network device 116a.

At step 404, a connection error may be received (e.g., by the user device 102). The connection error may correspond to a failure to establish the first network connection. The connection error may also correspond to a disconnection from the first network device 116a. At step 406, an indication of a failed network connection with the first network device 116a may be transmitted (e.g., by the user device 102 to a computing device 104). The indication of a failed network connection with the first network device 116a may be transmitted (e.g., by the user device 102 to a computing device 104) after receiving the connection error. The indication of a failed network connection with the first network device 116a may correspond to a failed attempt (e.g., by the first user device 102) to establish a network connection with the first network device 116a. The indication of the failed network connection with the first network device 116a may correspond to a disconnection (e.g., by the first user device 102) from the first network device 116a. The indication of the failed network connection with the first network device 116a may correspond to a failure to receive (e.g., by the first user device 102), within a predefined time, a response to a request transmitted to the first network device 116a. The failed network connection may correspond to a first network connection type and the indication of the failed network connection may be transmitted through another network connection of a second network connection type. The failed network connection may correspond to a failed wireless local area network (WLAN) connection, while the indication of the failed network connection may be transmitted using a cellular network connection.

At step 408, it is determined (e.g., by the user device 102) that one or more characteristics 119 of the first network device 116a have been modified. Determining that one or more characteristics 119 of the first network device 116a have been modified may include receiving (e.g., by the user device 102 from the computing device 104) an indication that the one or more characteristics 119 of the first network device 116a have been modified. The indication that the one or more characteristics 119 of the first network device 116a have been modified may identify the modified one or more characteristics 119 of the first network device 116a. Determining that one or more characteristics 119 of the first network device 116a have been modified may be based on a beacon or other signal received (e.g., by the user device 102) from the first network device 116a. A beacon may be received from the first network device 116a, with the beacon indicating one or more characteristics 119 associated with a wireless network implemented by the first network device 116a. The beacon may indicate an SSID, wireless channel, wireless network standard, modulation scheme, power level, or characteristic 119. The one or more characteristics 119 indicated in the beacon may be compared to one or more characteristics 119 in a previously received beacon to determine if there is a difference, thereby determining that the one or more characteristics 119 of the first network device 116a have been modified.

At step 410, a network connection to the first network device 116a may be attempted (e.g., by the user device 102). The network connection to the first network device 116a may be attempted (e.g., by the user device 102) after determining that the one or more characteristics 119 of the first network device 116a have been modified. If the network connection established in step 406 fails, steps 402, 404, and 406 may be repeated.

A mobile device fails to establish a WiFi connection to a WiFi access point. The mobile device transmits an indication of the failed WiFi connection to a server. The mobile device then monitors beacons transmitted by the WiFi access point and compares the parameters encoded in the beacons to parameters encoded in beacons received prior to transmitting the indication of the failed network connection. When it is determined that a difference is present between the parameters encoded in beacons (indicating that some remedial action has taken place by the server), the mobile device reattempts its WiFi connection to the WiFi access point.

FIG. 5 is a flowchart 500 of a method. In step 502, an indication of a failed network connection of a first user device 102 with a first network device 116a may be received (e.g., by a computing device 104). The indication of a failed network connection with the first network device 116a may correspond to a failed attempt by the first user device 102 to establish a network connection with the first network device 116a. The indication of the failed network connection with the first network device 116a may correspond to a disconnection by the first user device 102 from the first network device 116a. The indication of the failed network connection with the first network device 116a may correspond to a failure to receive, by the first user device 102, a response to a request transmitted to the first network device 116a within a predefined time. The failed network connection may correspond to a first network connection type and the indication of the failed network connection may be transmitted by the first user device 102 through another network connection of a second network connection type. The failed network connection may correspond to a failed wireless local area network (WLAN) connection, while the indication of the failed network connection may be transmitted by the first user device 102 using a cellular network connection available to the first user device 102.

At step 504, it may be determined (e.g., by the computing device 104) that a modification restriction to at least one first characteristic 119 of the first network device 116a exists. The existence of the modification restriction to the at least one first characteristic 119 of the first network device 116a may be determined after receiving the indication of the failed network connection. Determining that a modification restriction to the at least one first characteristic 119 of the first network device 116a exists may include determining a lack of access rights or access credentials for the first network device 116a. Determining that a modification restriction to the at least one first characteristic 119 of the first network device 116a exists may include determining a lack of a management relationship to the first network device 116a. Determining that a modification restriction to the at least one first characteristic 119 of the first network device 116a exists may include determining that one or more user defined permissions restrict modification to the at least one first characteristic 119 of the first network device 116a.

At step 506, at least one second characteristic 119 of the at least one second network device 116b may be determined (e.g., by the computing device 104). The at least one second characteristic 119 of the at least one second network device 116b may be determined (e.g., by the computing device 104) after determining that a modification restriction to the at least one first characteristic 119 of the first network device 116a exists. The one or more second characteristics 119 may include an SSID, transmission power, wireless channel, wireless networking standard, modulation scheme, or other attributes of the wireless network implemented by the at least one second network device 116b. The one or more second characteristics 119 may include one or more antennae (unidirectional or multidirectional) facilitating transmission or reception of signals to or from the at least one second network device 116b.

The at least one second characteristic 119 of the at least one second network device 116b may be determined based on one or more characteristics 119 of the first network device 116a corresponding to a wireless network implemented by the first network device 116a. The one or more characteristics 119 corresponding to the wireless network implemented by the first network device 116b may be received from the first network device 116a. Such characteristics 119 may include an SSID, a wireless channel, a modulation type, a wireless network standard, a power level, identifiers 118 (e.g., Media Access Control (MAC) addresses), network addresses (e.g., Internet Protocol (IP) addresses), or an attribute of the wireless network implemented by the first network device 116b.

The at least second one characteristic 119 of the at least one second network device 116b may be determined based on data received from the first network device 116a indicating wireless network activity detected by the first network device 116a. The data indicating wireless activity detected by the first network device 116b may also indicate at least one second characteristic 119 from at least one second network device 116b detected by the first network device 116a. The first network device 116a may receive beacons or other signals transmitted by the at least one second network device 116b indicating the at least one second characteristic 119 of the at least one second network device 116b. The at least one second characteristic 119 of the one or more second network devices 116b may then be transmitted by the first network device 116a for reception (e.g., by the computing device 104). The data indicating wireless activity detected by the first network device 116a may also include detected interference levels or signal strengths (e.g., a received signal strength indicator (RSSI)).

The at least one second characteristic 119 of the at least one second network device 116b may be determined based on one or more second characteristics 119 of the at least one second network device 116b corresponding to a wireless network implemented by the at least one second network device 116b. The at least one second network device 116b may transmit the one or more characteristics 119 for reception (e.g., by the computing device 104). The at least one second characteristic 119 of the at least one second network device 116b may be determined based on data received from the at least one second network device 116b indicating wireless network activity detected by the at least one second network device 116b.

The at least one second characteristic 119 of the at least one second network device 116b may also be determined based on data received (e.g., by the computing device 104) from the first user device 102 indicating wireless network activity detected by the first user device 102. The data indicating wireless network activity detected by the first user device 102 may be associated with the first network device 116a or the at least one second network device 116b. The first network device 116a and at least one second network device 116b may or may not detect each other, but are detectable by the first user device 102. The at least one second characteristic 119 of the at least one second network device 116b may also be determined based on data received (e.g., by the computing device 104) from at least one second user device 102 indicating wireless network activity detected by the at least one second user device 102. The at least one second user device 102 may be associated with the first network device 116a or the at least one second network device 116b. For example, the at least one second user device 102 may have an established network connection (e.g., WLAN connection) with the first network device 116a or the at least one second network device 116b. The at least one second user device 102 may be independent of the first network device 116a and the at least one second network device 116b. The at least one second user device 102 may receive beacons or other signals from the first network device 116a or the at least one second network device 116b, but not maintain a network collection to the first network device 116a or the at least one second network device 116b. The at least one second user device 102 may then transmit (e.g., to the computing device 104) data based on the beacons indicating wireless network activity detected by the at least one second user device 102.

The at least one second characteristic 119 of the at least one second network device 116b may be determined based on location data associated with the first network device 116a, the at least one second network device 116b, the first user device 102, and/or the second user device 102. The location data may correspond to global positioning system (GPS) data, wireless network triangulation data, or cellular network triangulation data. The location data may be determined by the computing device 104. Determining the location data may include determining a user account associated with the first network device 116a, the at least one second network device 116b, the first user device 102, and/or the second user device 102. The location data may then be determined as an address or other location identifier associated with the account.

Using the location data, determining the at least one second characteristic 119 of the at least one second network device 116b may include correlating the location data with the data described above received from the first network device 116a, the at least one second network device 116b, the first user device 102, and/or the second user device 102 (e.g., data indicating detected wireless activity or data associated with implemented wireless networks).

Determining the at least one second characteristic 119 of the at least one second network device 116b may include applying a machine learning model and/or a rule-based model to the location data and/or the data received from the first network device 116a, the at least one second network device 116b, the first user device 102, and/or the second user device 102.

At step 508, modification to the at least one second characteristic 119 of the at least one second network device 116b may be caused (e.g., by the computing device 104). The modification to the at least one second characteristic 119 of the at least one second network device 116b may be after determining the at least one second characteristic 119 of the at least one second network device 116b. Causing modification to the at least one second characteristic 119 of the at least one second network device 116b may include transmitting instructions to the at least one second network device 116b. Instructions may be transmitted to the at least one second network device 116b via an application programming interface (API) exposed by the at least one second network device 116b. The instructions may be transmitted to at least one second first network device 116b to modify an SSID, transmission power, wireless channel, wireless networking standard, modulation scheme, or other attributes of the wireless network implemented by at least one second network device 116b. The at least one second network characteristic 119 may be modified on a per-antenna basis. Instructions may be transmitted to the at least one second network device 116b to enable or disable one or more directional antennas of the at least one second network device 116b based on the location of the first network device 116a and/or the at least one second network device 116b.

A mobile device fails an attempt to connect to a first WiFi access point. The mobile device transmits an indication of the failed network connection to a server using a cellular connection. The server receives, from the first WiFi access point, data indicating that the first Wi-Fi access point may be operating on Wi-Fi channel 6. The server also receives, from a second WiFi access point, data indicating that the second Wi-Fi access point may be operating on Wi-Fi channel 6. The server may access location data for the first and second WiFi access points from a database. The location data indicates that both the first and second WiFi access points are within a distance threshold relative to the mobile device. As two WiFi access points near the mobile device are operating on the same WiFi channel, this may affect the ability for the mobile device to connect to the first WiFi access point.

The server may determine that the Wi-Fi channel of the first Wi-Fi access point may be restricted from modification. An API call attempting to change the channel of the first Wi-Fi access point may be denied. The server may then make an API call to the second WiFi access point to change its WiFi channel, thus resolving the channel conflict between the first and second WiFi access points.

The methods and systems may be implemented on a computer 601 as shown in FIG. 6 and described below. The user device 102 and/or computing device 104 of FIG. 1 may be a computer as shown in FIG. 6. Similarly, the methods and systems described may utilize one or more computers to perform one or more functions in one or more locations. FIG. 6 is a block diagram showing an operating environment for performing the described methods. This operating environment is only an example of an operating environment and is not intended to suggest any limitation as to the scope of use or functionality of operating environment architecture. Neither should the operating environment be interpreted as having any dependency or requirement relating to any one or combination of components shown in the operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the described methods and systems may be performed by software components. The described systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods described herein may be implemented via a general-purpose computing device in the form of a computer 601. The components of the computer 601 may comprise, but are not limited to, one or more processors 603, a system memory 612, and a system bus 613 that couples various system components including the one or more processors 603 to the system memory 612. The system may utilize parallel computing.

The system bus 613 represents one or more of several possible types of bus structures, including a memory bus or memory controller, a peripheral bus, an accelerated graphics port, or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description may also be implemented over a wired or wireless network connection and each of the subsystems, including the one or more processors 603, a mass storage device 604, an operating system 605, device configuration software 606, device configuration data 607, a network adapter 608, the system memory 612, an Input/Output Interface 610, a display adapter 609, a display device 611, and a human machine interface 602, may be contained within one or more remote computing devices 614a,b,c at physically separate locations, connected through buses of this form, in effect implementing a fully distributed system.

The computer 601 typically comprises a variety of computer readable media. Exemplary readable media may be any available media that may be accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the device configuration data 607 and/or program modules such as the operating system 605 and the device configuration software 606 that are immediately accessible to and/or are presently operated on by the one or more processors 603.

The computer 601 may also comprise other removable/non-removable, volatile/non-volatile computer storage media. FIG. 6 shows the mass storage device 604 which may provide non-volatile storage of computer code, computer readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 604, including the operating system 605 and the device configuration software 606. Each of the operating system 605 and the device configuration software 606 (or some combination thereof) may comprise elements of the programming and the device configuration software 606. The device configuration data 607 may also be stored on the mass storage device 604. The device configuration data 607 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the one or more processors 603 via the human machine interface 602 that is coupled to the system bus 613, but may be connected by other interface and bus structures, such as a parallel port, game port, an IEEE 1394 Port (also known as a Firewire port), a serial port, or a universal serial bus (USB).

The display device 611 may also be connected to the system bus 613 via an interface, such as the display adapter 609. It is contemplated that the computer 601 may have more than one display adapter 609 and the computer 601 may have more than one display device 611. The display device 611 may be a monitor, an LCD (Liquid Crystal Display), or a projector. In addition to the display device 611, other output peripheral devices may comprise components such as speakers (not shown) and a printer (not shown) which may be connected to the computer 601 via the Input/Output Interface 610. Any step and/or result of the methods may be output in any form to an output device. Such output may be any form of visual representation, including, but not limited to, textual, graphical, animation, audio, tactile, and the like. The display device 611 and computer 601 may be part of one device, or separate devices.

The computer 601 may operate in a networked environment using logical connections to one or more remote computing devices 614a,b,c. A remote computing device may be a personal computer, portable computer, smartphone, a server, a router, a network computer, a peer device or other common network node, and so on. Logical connections between the computer 601 and a remote computing device 614a,b,c may be made via a network 615, such as a local area network (LAN) and/or a general wide area network (WAN). Such network connections may be through the network adapter 608. The network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the one or more processors 603 of the computer. An implementation of the device configuration software 606 may be stored on or transmitted across some form of computer readable media. Any of the described methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice described herein. It is intended that the specification and examples be considered as exemplary only, with a true scope and spirit being indicated by the following claims.

The invention claimed is:

1. An apparatus comprising:
    one or more processors; and
    memory storing processor-executable instructions that, when executed by the one or more processors, cause the apparatus to:
        receive, from a user device via a first network connection, an indication of a failed network connection with a first network device;
        determine, based on the indication of the failed network connection, at least one first characteristic of the first network device; and
        cause a modification to the at least one first characteristic of the first network device to facilitate a second network connection between the user device and the first network device.

2. The apparatus of claim 1, wherein the processor-executable instructions, when executed by the one or more processors, further cause the apparatus to receive, from the user device, the at least one first characteristic of the first network device.

3. The apparatus of claim 1, wherein the processor-executable instructions that, when executed by the one or more processors, cause the apparatus to cause the modification to the at least one first characteristic of the first network device, cause the apparatus to send, to the first network device, instructions to modify the at least one first characteristic.

4. The apparatus of claim 1, wherein the at least one first characteristic comprises a wireless frequency or a transmission power.

5. The apparatus of claim 1, wherein the processor-executable instructions, when executed by the one or more processors, further cause the apparatus to:
    receive, from the first network device, an indication of interference associated with at least one second network device; and
    wherein the processor-executable instructions that, when executed by the one or more processors, cause the apparatus to determine the at least one first characteristic of the first network device, cause the apparatus to determine, based on the indication of interference, the at least one first characteristic of the first network device.

6. The apparatus of claim 1, wherein the processor-executable instructions, when executed by the one or more processors, further cause the apparatus to:
    receive at least one second characteristic of at least one second network device,
    wherein the processor-executable instructions that, when executed by the one or more processors, cause the apparatus to determine the at least one first characteristic of the first network device, cause the apparatus to determine, based on the at least one second characteristic of the at least one second network device, the at least one first characteristic of the first network device.

7. The apparatus of claim 1, wherein the processor-executable instructions, when executed by the one or more processors, further cause the apparatus to:
    receive at least one second characteristic of at least one second network device,
    wherein the processor-executable instructions that, when executed by the one or more processors, cause the apparatus to receive the at least one second characteristic of the at least one second network device, cause the apparatus to receive the at least one second characteristic of the at least one second network device from at least one of the user device or the first network device.

8. An apparatus comprising:
    one or more processors; and
    memory storing processor-executable instructions that, when executed by the one or more processors, cause the apparatus to:
        send, to a first network device, a request to establish a first network connection with the first network device;
        receive, from the first network device, an indication of a connection error;
        send, to a computing device via a second network connection, the indication of the connection error with the first network device, wherein the computing device is configured to modify one or more characteristics of the first network device;
        determine that the one or more characteristics of the first network device have been modified; and
        establish a third network connection with the first network device.

9. The apparatus of claim 8, wherein the processor-executable instructions, when executed by the one or more processors, further cause the apparatus to:
    determine the one or more characteristics of the first network device; and
    send, to the computing device, the one or more characteristics of the first network device.

10. The apparatus of claim 8, wherein the processor-executable instructions, when executed by the one or more processors, further cause the apparatus to:
    determine one or more characteristics of a second network device; and send, to the computing device, the one or more characteristics of the second network device.

11. The apparatus of claim 8, wherein the processor-executable instructions that, when executed by the one or more processors, cause the apparatus to determine that the one or more characteristics of the first network device have been modified, cause the apparatus to receive, from the computing device, an indication that the one or more characteristics of the first network device have been modified.

12. The apparatus of claim 8, wherein the processor-executable instructions that, when executed by the one or more processors, cause the apparatus to determine that the one or more characteristics of the first network device have been modified, cause the apparatus to determine, based on a beacon from the first network device indicating the one or more characteristics, that the one or more characteristics of the first network device have been modified.

13. One or more non-transitory computer-readable media storing processor-executable instructions that, when executed by at least one processor, cause the at least one processor to:
receive, from a user device via a first network connection, an indication of a failed network connection with a first network device;
determine, based on the indication of the failed network connection, at least one first characteristic of the first network device; and
cause a modification to the at least one first characteristic of the first network device to facilitate a second network connection between the user device and the first network device.

14. The one or more non-transitory computer-readable media of claim 13, wherein the processor-executable instructions, when executed by the at least one processor, further cause the at least one processor to receive, from the user device, the at least one first characteristic of the first network device.

15. The one or more non-transitory computer-readable media of claim 13, wherein the processor-executable instructions that, when executed by the at least one processor, cause the at least one processor to cause the modification to the at least one first characteristic of the first network device, cause the at least one processor to send, to the first network device, instructions to modify the at least one first characteristic.

16. The one or more non-transitory computer-readable media of claim 13, wherein the at least one first characteristic comprises a wireless frequency or a transmission power.

17. The one or more non-transitory computer-readable media of claim 13, wherein the processor-executable instructions, when executed by the at least one processor, further cause the at least one processor to:
receive, from the first network device, an indication of interference associated with at least one second network device; and
wherein the processor-executable instructions that, when executed by the at least one processor, cause the at least one processor to determine the at least one first characteristic of the first network device, cause the at least one processor to determine, based on the indication of interference, the at least one first characteristic of the first network device.

18. The one or more non-transitory computer-readable media of claim 13, wherein the processor-executable instructions, when executed by the at least one processor, further cause the at least one processor to:

receive at least one second characteristic of at least one second network device,
wherein the processor-executable instructions that, when executed by the at least one processor, cause the at least one processor to determine the at least one first characteristic of the first network device, cause the at least one processor to determine, based on the at least one second characteristic of the at least one second network device, the at least one first characteristic of the first network device.

19. The one or more non-transitory computer-readable media of claim 13, wherein the processor-executable instructions, when executed by the at least one processor, further cause the at least one processor to:
receive at least one second characteristic of at least one second network device,
wherein the processor-executable instructions that, when executed by the at least one processor, cause the at least one processor to receive the at least one second characteristic of the at least one second network device, cause the at least one processor to receive the at least one second characteristic of the at least one second network device from at least one of the user device or the first network device.

20. One or more non-transitory computer-readable media storing processor-executable instructions that, when executed by at least one processor, cause the at least one processor to:
send, to a first network device, a request to establish a first network connection with the first network device;
receive, from the first network device, an indication of a connection error;
send, to a computing device via a second network connection, the indication of the connection error with the first network device, wherein the computing device is configured to modify one or more characteristics of the first network device;
determine that the one or more characteristics of the first network device have been modified; and
establish a third network connection with the first network device.

21. The one or more non-transitory computer-readable media of claim 20, wherein the processor-executable instructions, when executed by the at least one processor, further cause the at least one processor to:
determine the one or more characteristics of the first network device; and
send, to the computing device, the one or more characteristics of the first network device.

22. The one or more non-transitory computer-readable media of claim 20, wherein the processor-executable instructions, when executed by the at least one processor, further cause the at least one processor to:
determine one or more characteristics of a second network device; and
send, to the computing device, the one or more characteristics of the second network device.

23. The one or more non-transitory computer-readable media of claim 20, wherein the processor-executable instructions that, when executed by the at least one processor, cause the at least one processor to determine that the one or more characteristics of the first network device have been modified, cause the at least one processor to receive, from the computing device, an indication that the one or more characteristics of the first network device have been modified.

24. The one or more non-transitory computer-readable media of claim 20, wherein the processor-executable instructions that, when executed by the at least one processor, cause the at least one processor to determine that the one or more characteristics of the first network device have been modified, cause the at least one processor to determine, based on a beacon from the first network device indicating the one or more characteristics, that the one or more characteristics of the first network device have been modified.

25. A system comprising:
a user device configured to:
send, via a first network connection, an indication of a failed network connection with a first network device; and
a computing device configured to:
receive, from the user device via the first network connection, the indication of the failed network connection with the first network device;
determine, based on the indication of the failed network connection, at least one first characteristic of the first network device; and
cause a modification to the at least one first characteristic of the first network device to facilitate a second network connection between the user device and the first network device.

26. The system of claim 25, wherein the computing device is further configured to receive, from the user device, the at least one first characteristic of the first network device.

27. The system of claim 25, wherein the computing device is configured to cause the modification to the at least one first characteristic of the first network device by the computing device being configured to send, to the first network device, instructions to modify the at least one first characteristic.

28. The system of claim 25, further comprising:
the first network device configured to:
send an indication of interference associated with at least one second network device; and
wherein the computing device is further configured to:
receive, from the first network device, the indication of interference associated with the at least one second network device,
wherein the computing device is configured to determine the at least one first characteristic of the first network device by the computing device being configured to determine, based on the indication of interference, the at least one first characteristic of the first network device.

29. The system of claim 25, wherein the computing device is further configured to:
receive at least one second characteristic of at least one second network device,
wherein the computing device is configured to determine the at least one first characteristic of the first network device by the computing device being configured to determine, based on the at least one second characteristic of the at least one second network device, the at least one first characteristic of the first network device.

30. The system of claim 25, wherein the computing device is further configured to:
receive, from at least one of the user device or the first network device, at least one second characteristic of at least one second network device.

* * * * *